United States Patent Office 3,008,843
Patented Nov. 14, 1961

3,008,843
CEMENT COMPOSITION
Eugene R. Jolly, % Super Concrete Emulsions Ltd.,
1372 E. 15th St., Montebello 21, Calif.
No Drawing. Filed Oct. 6, 1958, Ser. No. 765,321
6 Claims. (Cl. 106—90)

This invention relates to a cement composition and additive and has for one of its principal objects the provision of an improved method and material for waterproofing of concretes and mortars made from Portland cement, whereby the various desirable qualities such as workability, impermeability, strength and other properties are greatly improved.

One object of the invention is to provide Portland cement concretes and mortars containing an additive which greatly reduces the water absorption of the treated concrete or mortar, but without impairing the strength of the final product.

Another object of this invention is to provide an improved concrete or mortar in which the amount of gauging water may be reduced without adversely affecting the plasticity or other physical properties of the mixture.

Yet another object of the invention is to provide a method of treatment for brick mortar which will substantially reduce the occurrence of alkali bloom or efflorescence on brick construction by virtue of the reduced moisture movement through the mortar which has been treated by the additives of this invention.

Another and still further important object of the invention is to provide a material or additive for imparting to Portland and other hydraulic cements and their mortars and concretes, waterproofness and reduced absorption, and wherein such material can be very feasibly interground into a quantity of cement, even though the material itself is in liquid form.

A still further object is to provide a material or additive for cement, which will retard the loss of water from fresh concrete, while at the same time improving the curing qualities.

This invention provides a further development and a considerable improvement over the treating agent process and composition described in U.S. Letters Patent No. 1,772,999, granted to Frederick W. Huber of Riverside, California, on August 12, 1930.

The above-described patent relates to a petroleum oil combined with an alkaline earth metal salt solution in emulsion form, and wherein the oil so used constitutes the external phase. Because the oil is in this external phase, the resultant emulsion is difficult to disperse in the aqueous system of concretes and uniform mixing can be accomplished only with considerable difficulty. This stable emulsion prepared in accordance with the patent disclosure, is always an extremely heavy jelly, which is difficult to accurately proportion and dispense or use. Additionally, the specified emulsifiers have been found to have a distinctly deleterious effect on the concrete or mortar strength at the usual twenty-eight day period.

Accordingly, one of the important objects of this invention is to provide such an additive for cement wherein the emulsion of oil and alkaline earth metal salt solution is in a water thin state as distinguished from a heavy jelly state, and wherein the oil of the composition is in the internal phase.

An object of the invention is to provide an emulsion concentrate which can be caused to disperse in water at any dilution ratio, and wherein the oil part of the emulsion acts as the water repellant constituent and the water part of the emulsion acts as the accelerator.

Other and further important objects of the invention will be apparent from the disclosures in the following description and specification.

According to this invention, the undesirable results and above described difficulties may be overcome and a hardened concrete with greater improved waterproofing qualities can be provided by introducing into the cement, concrete, mortar or the like, (1) a petroleum oil containing an oil soluble, non-ionic dispersing or surface active agent, or (2) a petroleum oil emulsion concentrate in which the oil contains an oil soluble, non-ionic dispersing or surface active agent, is which the oil is the internal phase, the water phase constituting an aqueous solution of an alkaline earth metal salt. In either case, upon mixing with the relatively large proportions of water in the concrete or mortar composition, an unstable emulsion is formed which serves to uniformly distribute the oil but which emulsion quickly breaks to provide substantially complete separation of the oil from the water phase.

The most effective oil soluble, non-ionic dispersing agents according to the practice of this invention comprise non-ionic alkylene oxide condensation products and specifically the alkylene oxide adducts of alkyl phenols. Particularly effective agents are the ethylene oxide condensation products, all of which contain the polyoxyethylene group: $(CH_2OCH_2)_n$. Agents of this type are non-ionic, that is, they ionize in water to a neglible extent, and have the general structure: $R-(CH_2OCH_2)_n-OH$ wherein "R" represents the alkyl phenyl group and "$n$" has a value of at least 2 but not more than 20. Products of this class are characterized by the fact that oil solubility or water solubility is determined by the length of the ethoxy chain. Increased lengthening of the chain (increasing "$n$") results in a water soluble agent which is unsuitable for use according to this invention, except in special instances, such as when utilizing a blend of dispersing agents. Octyl phenoxy polyethoxy ethanol, nonyl phenyl ether of polyethylene glycol, and, generally, any agents of the alkyl-aryl polyethoxy alcohol type are particularly suitable. Also within the scope of this invention are the partial esters of the common fatty acids (lauric, palmitic, stearic, and oleic) and hexitol anhydrides (hexitans and hexides), derived from sorbitol, such as the "Spans" manufactured by Atlas Powder Company. These compounds are suitable for use in the preparation of an oil concentrate not containing the strength accelerating agent, but if incorporated in an emulsion concentrate containing a solution of the accelerating agent, these dispersant compounds must be blended with dispersants of ethylene oxide type.

The addition of petroleum oil to Portland cement concretes is known to retard the rate of hydration and adversely influence the hardening and development of strength. In order to offset this effect, it has been necessary to add an accelerator to the oil, usually one of several inorganic salts whose aqueous solutions act as an accelerator upon the hydration of hydraulic cements, such as the alkaline earth metal salt solutions.

It is all the more surprising then, that, according to this invention, the use of alkaline earth metal salt accelerators can be eliminated entirely.

I have found that hydrocarbon oils containing an oil dispersant of the type described above when added to Portland cement concrete has no appreciable retarding effect at seven days, and increases the twenty-eight day strength in contrast to reducing strength, as would be expected. It is a most important advantage that the use of accelerators can be eliminated as the resulting fast set causes extreme difficulty in working mortars and finishing concretes during warm weather. During cold weather, accelerators can be used to advantage, and the scope and usefulness of this invention is thereby broadened, in that inorganic salt solution accelerators are easily incorporated and emulsified with hydrocarbon oils containing dispersants of the type described.

Inasmuch as the waterproofing effect arises from an intimate distribution of oil throughout the wet mix Portland cement concretes, an important feature of this invention is that this is accomplished quickly and without difficulty of an extended long mixing time, and that when the concrete has hardened the uniformly deposited oil film remains effective in reducing absorption. The additive is in liquid form and is easily proportioned and dispensed by the user. The uniformly deposited oil retards the rate at which water is lost from the fresh concrete in drying and therefore provides a longer curing time than would otherwise be possible without the addition of the oil.

Example I

By way of illustration of the method of preparation of useful cement compositions employing the hereinabove described products without the use of strength accelerating agents, the following is submitted: To 300 pounds of refined petroleum oil (Golden Bear No. 132 oil; 1500 S.S.U. visc. at 100° F.) was added 0.9 gallon of "Oronite NI-O," an alkyl phenoxy polyethoxy ethanol manufactured by Oronite Chemical Co.

The oil concentrate prepared according to this example was added to a Portland cement concrete mix so proportioned as to contain 5.4 sacks of cement per cubic yard, with the following results:

| Additive | None | Oil (Example I). |
|---|---|---|
| Amount per sack | | 1 pint. |
| Slump | 4½" | 6". |
| Air content | 2.1% | 2.2%. |
| Water/cement ratio (Gallons per sack) | 7.43 | 7.09. |
| 28 day strength, Avg. p.s.i | 3,225 | 3,355. |

It is significant, that even though the concrete with oil, in which no accelerator is used, had greatly increased plasticity, as shown by the increase in slump, an improvement in strength resulted which would have been even greater had the consistency been adjusted to the same 4½" slump of the plain mix. Standard 6" cubes were cast for absorption tests from each of the above batches. Concrete containing oil reduced the 24 hour absorption by 30.5%.

By way of illustration of the improvement provided according to this invention over the prior art, a lime mortar was prepared and proportioned using 1 part cement, 3.75 parts sand and .25 part lime putty by volume with identical water cement ratios. Results of this test are shown in the following:

| Additive | Oil Emulsion (Pat. 1,772,999). | Oil (Prepared as in Ex. I). |
|---|---|---|
| Amount per sack | .2 gallons | 1 pint. |
| 7 day strength, avg. p.s.i | 1,865 | 2,105. |
| 28 day strength, avg. p.s.i | 2,800 | 3,705. |

It is significant that even though the hydrocarbon oil emulsion prepared as in U.S. Patent 1,772,999 contains a strength accelerating alkaline earth metal salt, twenty-eight day strength is almost 25% less than is shown by the hydrocarbon oil additive prepared according to Example I of this invention, without the addition of a strength accelerating alkaline earth metal salt.

Example II

A further example illustrating the invention without the use of strength accelerating agents is as follows:

Two identical concrete batches were made up using 94 pounds Portland cement, 254.3 lbs. washed concrete sand, 325.1 lbs. #3 gravel, one (A) without additive, and the other (B) with 12.5 ounces of the additive prepared by mixing 10 parts by weight of "Triton X-45" (octyl phenoxy polyethoxy ethanol containing 4-5 ethoxy groups, manufactured by Rohm & Haas) with 400 parts by weight of a refined mineral oil (Richfield Oil Company, "Process 1p"). The additive was a clear, stable solution, easily dispersed in the aqueous system of the Portland cement concrete mix. The physical properties were as follows:

| | A | B |
|---|---|---|
| Additive used | none | 12.5 ozs./sack. |
| Slump, inches | 7 | 7. |
| Workability | average | excellent. |
| Water/cement ratio (Gal./sack) | 7.65 | 6.90. |
| Wt./cu. ft | 143.4 lbs | 142.4 lbs. |
| 7 day strength, p.s.i | 1,795 | 1,975. |
| 28 day strength, p.s.i | 3,150 | 3,510. |

Further illustrative examples of oil concentrate compositions, not containing the accelerator, are as follows:

Example III 3 pounds of "Tergitol NP-27" (nonyl phenyl ether of polyethylene glycol, manufactured by Union Carbide Chemicals Company) were admixed with 400 pounds of the mineral oil of Example II to produce a clear, stable concentrate easily dispersible in the aqueous system of Portland cement concrete.

Example IV 3.5 pounds of "Brij-30" (polyoxyethylene lauryl alcohol manufactured by Atlas Powder Company) was added to 100 pounds of Golden Bear No. 132 mineral oil, with the same results as in Example III.

Example V 2.5 pounds of "Tween 81" (polyoxyethylene sorbitan mono-oleate manufactured by Atlas Powder Company) was added to 100 pounds of the mineral oil of Example IV, with the same results as in Example III.

The compositions of Examples I-V are characterized by the fact that upon mixing the concentrates with the aqueous cement composition, the oil dispersions thus formed are unstable, but serve to uniformly distribute the oil, in the form of an oil-in-water emulsion, during the mixing period, the emulsion breaking upon cessation of the agitation.

The following examples are illustrative of the oil emulsion concentrate compositions of this invention, which contain a setting accelerator:

Example VI

To 88 pounds of the mineral oil of Example I containing 2 gallons of "Oronite NI-O" is added 2 parts by volume of an aqueous solution of calcium chloride of 38° Baumé strength. The resulting emulsion was of water-thin consistency, the oil being in the internal phase, and instantly dispersible in aqueous systems. Following mixing with the cement mix, the emulsion is resolved into its separate parts, the oil being uniformly distributed throughout the mix and the accelerator being taken up by chemical reaction with the cement. The dispersing agent remains dissolved in the oil, which remains effective in reducing water absorption after the concrete has hardened. The improvement provided by this example of the invention is illustrated by the following test:

A lime mortar was prepared and proportioned using 1 part cement, 3.75 parts sand, and .25 part lime putty by volume and made up to a workable consistency with identical water to cement ratios, with the following results:

| Additive | Oil Emulsion (Prepared as in Pat. No. 1,772,999). | Oil Emulsion (Prepared as in Ex. VI). |
|---|---|---|
| Amount per sack | .2 gallons | .2 gallons. |
| 7 day strength, p.s.i | 1,865 | 2,300. |
| 28 day strength, p.s.i | 2,800 | 3,440. |

Example VII 15 pounds of "Tergitol NP-27" were added to 100 lbs. of the mineral oil of Example I. To the resulting clear oil mixture was added 271.2 pounds of a water solution of calcium chloride of 38° Baumé strength with constant agitation. A low viscosity, water-thin emulsion resulted.

Example VIII 15 pounds of "Triton X-45" were added to 100 pounds of the oil of Example II. To the resulting clear oil mixture was added 271.2 pounds of a water solution of calcium chloride of 38° Baumé strength with constant agitation. A clear gel was first formed which became thin after about half the chloride solution was added. The finished emulsion was water-thin.

Example IX 50 grams of "High Bond" oil manufactured by Mid West Oil Co. (40 wgt. SAE) was heated to 120° F., and 10 grams of "Oronite NI-O" added. To the clear oil mixture was added 235 ml. of a solution of calcium chloride having a 38° Baumé strength. A paste was first formed and the viscosity decreased with increasing chloride additions. The finished emulsion may sometimes have an undesirable viscosity, but becomes water-thin upon cooling.

Example X

Where the emulsifier is strongly hydrophobic, it may be necessary to modify it by additions of an hydrophilic emulsifier. For example:

10 grams of "Tergitol NP-14" was mixed thoroughly with 50 grams of the mineral oil of Example II. To this mixture was added 200 ml. of calcium chloride solution of 38° Baumé strength. At the end of this addition, 24 ml. of a 33% water solution of "Tergitol NPX" was added. The finished emulsion was characterized by the fact that it was water-thin in consistency, stable, and dispersed quickly and easily in water.

Example XI 5 grams of "Tergitol NP-14" and 5 grams of "Tergitol NPX" were added to 50 grams of "Ink Oil #10" manufactured by Standard Oil Co. of California. To this mixture was added 100 ml. of calcium chloride solution of 38° Baumé strength. The emulsion was characterized by the fact that it was water-thin, dispersed easily in water, and broke free oil from the resulting unstable emulsion formed by dilution in water in amount equivalent to that used in cement compositions.

Example XII

To 110 ml. of the oil of Example II was added 5 grams of "Span 80" (sorbitan mono-oleate, manufactured by Atlas Powder Co.) and 8 grams of "Tergitol NPX." To the resulting clear oil mixture was added 50 ml. of water. 430 ml. of calcium chloride solution, 40° Baumé was then added. A typical water-thin emulsion resulted.

Example XIII 105 grams of Union Oil Co. mineral oil "No. 709" and 21 grams of "Oronite NI-O" were mixed and heated to 120° F. to reduce viscosity. To the clear oil mixture was added 470 ml. of calcium chloride solution, specific gravity 1.354, pre-heated to 110° F. The emulsion went through various stages of viscosity during the chloride addition, but the finished emulsion was water-thin.

Example XIV 20 grams of "Tergitol NP-14" was added to 110 ml. of the oil of Example II. To the clear oil mixture was added 50 ml. of water, then 430 ml. of calcium chloride solution, specific gravity 1.4 was added. The finished emulsion was not milky, but translucent due to the exceptional dispersion of the oil. The emulsion was not stable to heat, but was otherwise satisfactory.

The aqueous solutions of several inorganic salts are known to act as accelerators upon the hydration of Portland cement. Among them are the chlorides of aluminum, ammonium, calcium and iron; sodium hydroxide, sodium silicate, hydrochloric acid and sodium carbonate. There are still other organic and inorganic compounds which have a similar effect and I do not limit my invention to those named. The alkaline earth metal salt solutions are particularly effective accelerating agents and these are to be especially considered in the preferred form of this invention.

It is to be understood that, while the oil is used in minor proportions, there may be considerable variation in the amount of oil used per sack of cement for different mixes and for different applications. It has been found that the oil may be varied from about 0.25 to about 5 percent by weight of the Portland cement. The oil soluble, non-ionic dispersing agent should be maintained within the proportion range of between about 1 and about 5 percent by weight of the oil when used in the oil concentrate without the accelerator. When using the oil emulsion concentrate including the accelerator solution, the proportion of dispersing agent is maintained within the range of about 10 to about 30 percent by weight of the oil. The concentration of the setting accelerator solution is preferably equivalent to a near saturated solution, and a saturated solution may be used if desired. The minimum concentration of the accelerator, such as calcium chloride, will vary somewhat depending upon the specific type of oil used and the specific type or types of dispersing agent used. However, the concentration should be sufficient to result in the production of an oil-in-water emulsion concentrate. If insufficient accelerator is used an objectionable water-in-oil emulsion or paste will be formed. For example, when utilizing the "Oronite NI-O" emulsifier a calcium chloride concentration of 35° Baumé produces a water-in-oil paste during the mixing operation due to the temperature of mixing, but upon cooling the emulsion inverts to the water-thin oil-in-water type emulsion. Accordingly, with this type of emulsifier concentrations appreciably below about 35° Baumé should be avoided. On the other hand, by blending with this dispersing agent another agent which is more hydrophilic, it is possible to obtain the desired oil-in-water emulsion with the use of smaller concentrations of calcium chloride or other accelerator.

The total quantity of calcium chloride or other accelerator added to the cement composition will vary depending upon the desired degree of cement set acceleration. In practice the concentration of calcium chloride, based upon the weight of the Portland cement, varies from 0 to about 2 percent. On the basis of the latter figure and the aforementioned range of about 0.25 to about 5% by weight of oil (based on the weight of the cement), the proportion of substantially saturated calcium chloride solution to oil in a satisfactory concentrate amounts to about 1 to 14 parts by volume of such solution to 1 part by volume of the oil. The proportions in the concentrates of Examples VI to XIV fall within the range of between about 2 and about 4 parts by volume of substantially saturated calcium chloride solution to 1 part by volume of oil.

While, as indicated in the above examples, it is preferred to mix the oil concentrate into the wet concrete mix, this invention includes within its scope mixing of the oil-dispersing agent solution or concentrate into the dry Portland cement. This can be readily done by the cement manufacturer by intergrinding the oil concentrate with the dry cement prior to sacking of the same.

In general, non-ionic surface active agents depend chiefly upon the accumulation within the molecular structure of hydroxyl groups (such as the sorbitol derivatives) or of ether linkages (from polyoxyethylene chains) to give varying degrees of hydrophilic action. Since non-ionic surface active dispersants as herein described are commercially available in wide variety, the material of this invention cannot be restricted to any one compound, combination of compounds, or any one class of such compounds.

Whenever the properties of any non-ionic dispersant are not known, a simple test can be made to determine whether or not such compound has the required properties and can be used in the oil emulsion concentrate of this invention. This test is as follows:

To 100 grams of oil is added an amount of the dispersant (usually in the range of 5 to 25 grams) sufficient to yield a stable water-in-oil emulsion when four parts by volume of water are added to the oil-dispersant mixture during vigorous agitation. If the test is repeated, using in place of water a calcium chloride solution of 38°–42° Baumé strength, a water-thin inverted oil-in-water emulsion should result. Under some conditions of mixing, the emulsion may be somewhat viscous immediately after mixing, but on standing several hours, will become water-thin. A suitable dispersant, or combination of dispersants, will therefore be one which will yield a water-in-oil type emulsion when the aqueous phase is water, and which will yield an oil-in-water type emulsion when the aqueous phase is a near saturated solution of calcium chloride.

The emulsion in its undiluted state is completely stable. However, this emulsion is distinguished from other emulsions in that, if diluted in water (as when mixing with the cement), a colloidal dispersion is first formed, which then breaks, giving a complete separation of the oil from the water phase. If the test gives an emulsion which is stable when diluted in water, then the dispersant and the emulsion is not to be considered suitable for use according to the present invention.

The above-described test is in effect a means of determining the hydrophilic (water-loving)—lipophilic (oil-loving) balance of the dispersant necessary to give the required type of emulsion. This balance may be found in one compound alone, or it may be obtained by blending a dispersant having strong hydrophilic properties with a dispersant having strong lipophilic properties.

A very similar test can be used to determine the suitability of any dispersing agent for use in the oil concentrate. Here, the dispersing agent is simply blended with the oil in the proportion range of 1–5 percent of dispersing agent by weight of the oil, and to the blend is added an amount of water equivalent to that to be used in the cement mix. If a milky dispersion is produced which breaks on standing, the dispersing agent is suitable, but if a stable water-in-oil emulsion is thus produced, the agent is unsuitable.

As already mentioned, the favorable improvement in properties which result from the treatment of hydraulic cement mortars and concretes by oils containing oil soluble dispersing agents, may be further modified and improved for special conditions of use by the addition of accelerators, air entraining agents, and the like, particularly where the application of the additive requires the special properties provided by these agents.

It is sometimes desirable to purposely entrain a limited amount of air into the wet concrete or mortar mix in order to improve frost resistance and resistance to freezing and thawing. It is to be understood that the addition agents of this invention may be combined and their various uses further improved by the additions of air entraining agents. Generally, the air entraining agent can be any surface active agent capable of reducing the surface tension of water. Especially suitable air entraining agents include the non-ionic water soluble alkyl-aryl polyethoxy alcohols and glycols wherein the number of ethoxy groups are present in sufficient number to result in solubility in water. Commercial products of this type are mixtures of homologous polyethoxy alcohols. The lower members of the series are soluble in oils, and are excellent solvents for the higher members. It is, therefore, possible to disperse a water soluble alkyl-aryl polyethoxy alcohol directly in the oil. By dispersing both oil soluble and water soluble alkyl-aryl polyethoxy alcohols in hydrocarbon oils, a composition results, which, when added to the aqueous system of Portland cement concretes and mortars, is resolved into its components by the water, whereby the water soluble polyethoxy alcohol is available to lower the surface tension of the mixing water sufficient to entrain an optimum amount of air into the mix.

This application is a continuation-in-part of my co-pending application Serial No. 606,206, now abandoned, filed August 27, 1956.

It is to be understood by those skilled in the art that this invention in its broad features is not restricted to the ingredients, methods or proportions herein referred to by way of illustration and that further modifications and methods of treatment are within the scope of this application, except as noted within the appended claims.

I claim:
1. A stable emulsion additive for waterproofing concretes and mortars, consisting essentially of a mineral oil, a substantially saturated aqueous solution of an alkaline earth metal accelerator salt in an amount between about 1 and about 14 parts by volume of said oil, and from about 10% to about 30% of an oil-soluble alkyl aryl polyethoxy alcohol, based upon the weight of said oil, said emulsion being stable and of water-thin consistency and having said oil in the internal phase.

2. The composition of claim 1, wherein the amount of said substantially saturated aqueous solution is between about 2 and about 4 parts by volume of said oil.

3. The composition of claim 1 wherein the mineral oil has a viscosity of the order of 1500 S.S.U. at 100° F.

4. The composition of claim 1, wherein said alkaline earth metal salt is calcium chloride.

5. A concrete or mortar composition, comprising Portland cement, an aggregate, and gauging water, to which has been added the emulsion additive of claim 1 in an amount sufficient to provide between about 0.25 to about 5% of the oil constituent of said additive, based on the weight of the Portland cement.

6. A stable emulsion additive for waterproofing concretes and mortars, consisting essentially of a mineral oil having a viscosity of the order of 1500 S.S.U. at 100° F., a substantially saturated aqueous calcium chloride solution in an amount between about 2 and about 4 parts by volume of said oil, and from about 10% to about 30% of an oil-soluble alkyl aryl polyethoxy alcohol, based on the weight of said oil, said emulsion being stable and of water-thin consistency and having said oil in the internal phase.

References Cited in the file of this patent

UNITED STATES PATENTS

| | | |
|---|---|---|
| 1,772,999 | Huber | Aug. 12, 1930 |
| 2,030,518 | Guibert | Feb. 11, 1936 |
| 2,243,501 | Daimler | May 27, 1941 |
| 2,727,827 | Chertkof | Dec. 20, 1955 |
| 2,782,857 | Clark | Feb. 26, 1957 |
| 2,798,003 | Morgan et al. | July 2, 1957 |
| 2,801,931 | Morgan | Aug. 6, 1957 |
| 2,878,875 | Dunlap | Mar. 24, 1959 |
| 2,890,752 | Crone | June 16, 1959 |